US008898210B2

(12) United States Patent
Mueller

(10) Patent No.: US 8,898,210 B2
(45) Date of Patent: Nov. 25, 2014

(54) METHOD AND APPARATUS FOR DETERMINING A MINIMUM/MAXIMUM OF A PLURALITY OF BINARY VALUES

(75) Inventor: Michael Mueller, Gomaringen (DE)

(73) Assignee: Advantest (Singapore) Pte Ltd, Singapore (SG)

( * ) Notice: Subject to any disclaimer, the term of this patent is extended or adjusted under 35 U.S.C. 154(b) by 370 days.

(21) Appl. No.: 12/532,834

(22) PCT Filed: Aug. 5, 2008

(86) PCT No.: PCT/EP2008/006437
§ 371 (c)(1),
(2), (4) Date: Apr. 26, 2011

(87) PCT Pub. No.: WO2010/015263
PCT Pub. Date: Feb. 11, 2010

(65) Prior Publication Data
US 2011/0191398 A1   Aug. 4, 2011

(51) Int. Cl.
*G06F 7/00* (2006.01)
*G06F 7/544* (2006.01)
(52) U.S. Cl.
CPC .................................. *G06F 7/544* (2013.01)
USPC .......................................... 708/207; 708/200
(58) Field of Classification Search
None
See application file for complete search history.

(56) References Cited

U.S. PATENT DOCUMENTS 4,539,549 A     9/1985   Hong et al.

OTHER PUBLICATIONS

Hong Wang, et al., "A Scalable Associative Processor with Applications in Database and Image Processing", Proceedings of the 18th International Parallel and Distributed Processing Symposium, 2004, 8 pages.
A.D. Falkoff, "Algorithms for Parallel-Search Memories", Journal of the ACM, ACM, New York, NY, US, vol. 9, No. 4, Oct. 1, 1962, pp. 488-511, XP007907208, ISSN: 0004-5411, Section "Search for Maximum and Minium" starting on page 496, first three paragraphs.
R. Hoare, et al., "Bitwise Aggregate Networks", Parallel and Distributed Processing, 1996., Eighth IEEE Symposium on New Orleans, LA, USA Oct. 23-26, 1996, Los Alamitos, CA, USA, IEEE Comput, Soc, US, Oct. 23, 1996, pp. 306-313, XP010205729, ISBN: 978-0-8186-7683-3 Section 2.4.
Christopher J. Hannaford, "A Computer Architecture for High Pin Count Testers", International Test Conference, 1991, pp. 1042-1047.

*Primary Examiner* — Michael D Yaary

(57) ABSTRACT

For determining a minimum/maximum of a plurality of binary values a bit position in the plurality of binary values is determined subsequent to which all bit values are the same. From the plurality of binary values those binary values are selected the bit values of which at the bit position determined in the preceding step and all subsequent positions, if any, has a predetermined value. The preceding steps are then repeated until only one binary value remains which is provided as the minimum or maximum.

12 Claims, 3 Drawing Sheets

METHOD AND APPARATUS FOR DETERMINING A MINIMUM/MAXIMUM OF A PLURALITY OF BINARY VALUES

BACKGROUND OF THE INVENTION

Embodiments of the invention concern a method and an apparatus for determining a minimum/maximum of a plurality of binary values, more specifically, embodiments of the invention concern a method and an apparatus for determining from a plurality of binary values stored at different locations remote from a central processor a minimum/maximum value.

Memory elements and integrated circuits (IC) need to be tested to ensure proper operation, and in particular, testing is a requirement during IC or memory development in manufacturing. During testing such devices under test (DUTs) are exposed to various types of stimulus signals, and responses from the devices are measured, processed, and usually compared to an expected response. Such testing may be carried out by automated test equipment (ATE) which usually performs these tasks according to a device-specific test program.

Examples for such automated test equipment are the Verigy V93000 Series and the Verigy V5000 Series, the first being a platform for testing system-on-a-chip, system-on-a-package, and high-speed memory devices. The latter series is for testing memory devices including flash memory and multi-chip packages at wafer sort and final test.

In such automated test equipment or testers, a plurality of test results might be obtained and stored at various locations remote from a central processing area. For example the results might be generated on the basis of different stimulus signals provided by a plurality of processing devices, or processors, which not only generate the stimulus signals, but also receive the response signals from the device under test or from a plurality of devices under test. For a test action, usually a test routine is executed on all channels in parallel. The test routines being executed or the data used by the test routines may differ between channels. However, for fast test execution it may be desired to make use of broadcast and common read wherever possible which necessitates that related test data of different channels is stored in all these channels at the same memory address. Finding out how to allocate memory chunks of certain sizes over certain sets of channels is done by the tester memory management. For some complex test applications there may be a constraint that related data of different channels has to be aligned at the same address which results in unused gaps in the tester memory. With increasing computing power of embedded processor inside the test processors each processor may manage its memory on its own and in the communication between the central processor and the test processors only symbolic addresses for memory chunks may be used. By this the constraint that related data of different channels has to be aligned at the same address may be avoided. However this may necessitate that the central processor knows the minimum or maximum of some values stored in the test processors. One example for this is the question: given a set of channels, how much memory can one still allocate over all these channels, i.e., what is the minimum size of the largest contiguous block of free memory on each of these channels?

SUMMARY

According to an embodiment, a method for determining a minimum/maximum of a plurality of binary values held by a plurality of processor memories or memories associated with respective processors may have the steps of: (a) determining a bit position in the plurality of binary values subsequent to which all bit values are the same, wherein step (a) initially may have the steps of: (a.1) commonly reading all binary values from all memories and generating a bit-wise OR combination and a bit-wise AND combination of the commonly read binary values, and (a.2) based on the bit-wise OR combination and the bit-wise AND combination of the commonly read binary values, determining the bit location in the plurality of binary values subsequent to which all bit values are the same; (b) selecting from the plurality of binary values, those binary values, the bit value of which at the bit position determined in (a) and all subsequent bit positions, if any, comprises a predetermined value; (c) repeating steps (a) and (b), wherein step (a) is repeated on the basis of the binary values selected in step (b) until only one selected binary value, or a plurality of matching binary values, remain; and (d) providing the remaining binary value as the minimum/maximum.

According to another embodiment, a computer storage medium may have a computer readable program code for carrying out, when executing the program code by a processor, a method for determining a minimum/maximum of a plurality of binary values held by a plurality of processor memories or memories associated with respective processors, the method having the steps of: (a) determining a bit position in the plurality of binary values subsequent to which all bit values are the same, wherein the determining initially may have the steps of: (a.1) commonly reading all binary values from all memories and generating a bit-wise OR combination and a bit-wise AND combination of the commonly read binary values, and (a.2) based on the bit-wise OR combination and the bit-wise AND combination of the commonly read binary values, determining the bit location in the plurality of binary values subsequent to which all bit values are the same; (b) selecting from the plurality of binary values, those binary values, the bit value of which at the bit position determined in the determining and all subsequent bit positions, if any, comprises a predetermined value; (c) repeating the determining and selecting, wherein the determining is repeated on the basis of the binary values selected in the selecting until only one selected binary value, or a plurality of matching binary values, remain; and (d) providing the remaining binary value as the minimum/maximum.

According to another embodiment, a computer program product may have a computer readable program code for carrying out, when executing the program code by a processor, a method for determining a minimum/maximum of a plurality of binary values held by a plurality of processor memories or memories associated with respective processors, the method having the steps of: (a) determining a bit position in the plurality of binary values subsequent to which all bit values are the same, wherein the determining initially may have the steps of: (a.1) commonly reading all binary values from all memories and generating a bit-wise OR combination and a bit-wise AND combination of the commonly read binary values, and (a.2) based on the bit-wise OR combination and the bit-wise AND combination of the commonly read binary values, determining the bit location in the plurality of binary values subsequent to which all bit values are the same; (b) selecting from the plurality of binary values, those binary values, the bit value of which at the bit position determined in the determining and all subsequent bit positions, if any, comprises a predetermined value; (c) repeating the determining and selecting, wherein the determining is repeated on the basis of the binary values selected in the selecting until only one selected binary value, or a plurality of matching binary values, remain; and (d) providing the remaining binary value as the minimum/maximum.

According to another embodiment, a computer program may have a program code for carrying out, when executing the program code by a processor, a method for determining a minimum/maximum of a plurality of binary values held by a plurality of processor memories or memories associated with respective processors, the method having the steps of: (a) determining a bit position in the plurality of binary values subsequent to which all bit values are the same, wherein the determining initially may have the steps of: (a.1) commonly reading all binary values from all memories and generating a bit-wise OR combination and a bit-wise AND combination of the commonly read binary values, and (a.2) based on the bit-wise OR combination and the bit-wise AND combination of the commonly read binary values, determining the bit location in the plurality of binary values subsequent to which all bit values are the same; (b) selecting from the plurality of binary values, those binary values, the bit value of which at the bit position determined in the determining and all subsequent bit positions, if any, comprises a predetermined value; (c) repeating the determining and selecting, wherein the determining is repeated on the basis of the binary values selected in the selecting until only one selected binary value, or a plurality of matching binary values, remain; and (d) providing the remaining binary value as the minimum/maximum.

According to another embodiment, a system for determining a minimum/maximum of a plurality of binary values held by a plurality of memories associated with respective processors may have: a central processor; a logic coupled to the central processor and configured to output a bit-wise OR combination and a bit-wise AND combination of a plurality of input values to the central processor; and a plurality of memories associated with respective processors, each of the memories being coupled to the logic and configured to hold one of the plurality of binary values, wherein the central processor is configured to operate in accordance with a method for determining a minimum/maximum of a plurality of binary values held by a plurality of processor memories or memories associated with respective processors, the method having the steps of: (a) determining a bit position in the plurality of binary values subsequent to which all bit values are the same, wherein the determining initially may have the steps of: (a.1) commonly reading all binary values from all memories and generating a bit-wise OR combination and a bit-wise AND combination of the commonly read binary values, and (a.2) based on the bit-wise OR combination and the bit-wise AND combination of the commonly read binary values, determining the bit location in the plurality of binary values subsequent to which all bit values are the same; (b) selecting from the plurality of binary values, those binary values, the bit value of which at the bit position determined in the determining and all subsequent bit positions, if any, comprises a predetermined value; (c) repeating the determining and selecting, wherein the determining is repeated on the basis of the binary values selected in the selecting until only one selected binary value, or a plurality of matching binary values, remain; and (d) providing the remaining binary value as the minimum/maximum.

According to another embodiment, an apparatus for determining a minimum/maximum of a plurality of binary values held by a plurality of processor memories or memories associated with respective processors may have: a processor configured to operate in accordance with a method for determining a minimum/maximum of a plurality of binary values held by a plurality of processor memories or memories associated with respective processors, the method having the steps of: (a) determining a bit position in the plurality of binary values subsequent to which all bit values are the same, wherein the determining initially may have the steps of: (a.1) commonly reading all binary values from all memories and generating a bit-wise OR combination and a bit-wise AND combination of the commonly read binary values, and (a.2) based on the bit-wise OR combination and the bit-wise AND combination of the commonly read binary values, determining the bit location in the plurality of binary values subsequent to which all bit values are the same; (b) selecting from the plurality of binary values, those binary values, the bit value of which at the bit position determined in the determining and all subsequent bit positions, if any, comprises a predetermined value; (c) repeating the determining and selecting, wherein the determining is repeated on the basis of the binary values selected in the selecting until only one selected binary value, or a plurality of matching binary values, remain; and (d) providing the remaining binary value as the minimum/maximum.

Embodiments of the invention provide an apparatus for determining a minimum/maximum of a plurality of binary values which comprises a processor which is configured to operate in accordance with the method of embodiments of the invention.

Further embodiments of the invention provide a system for determining a minimum/maximum of a plurality of binary values, wherein the system comprises a central processor, a logic coupled to the central processor and configured to output a bit-wise OR combination and a bit-wise AND combination of a plurality of input values to the central processor, and a plurality of memories associated with respect to processors, each memory being coupled to the logic and coupled to hold one of the plurality of binary values, wherein the central processor is configured to operate in accordance with the method of embodiments of the invention.

BRIEF DESCRIPTION OF THE DRAWINGS

Embodiments of the present invention will be described in the following with reference to the accompanying drawings in which.

DETAILED DESCRIPTION OF THE INVENTION

Figure 1:
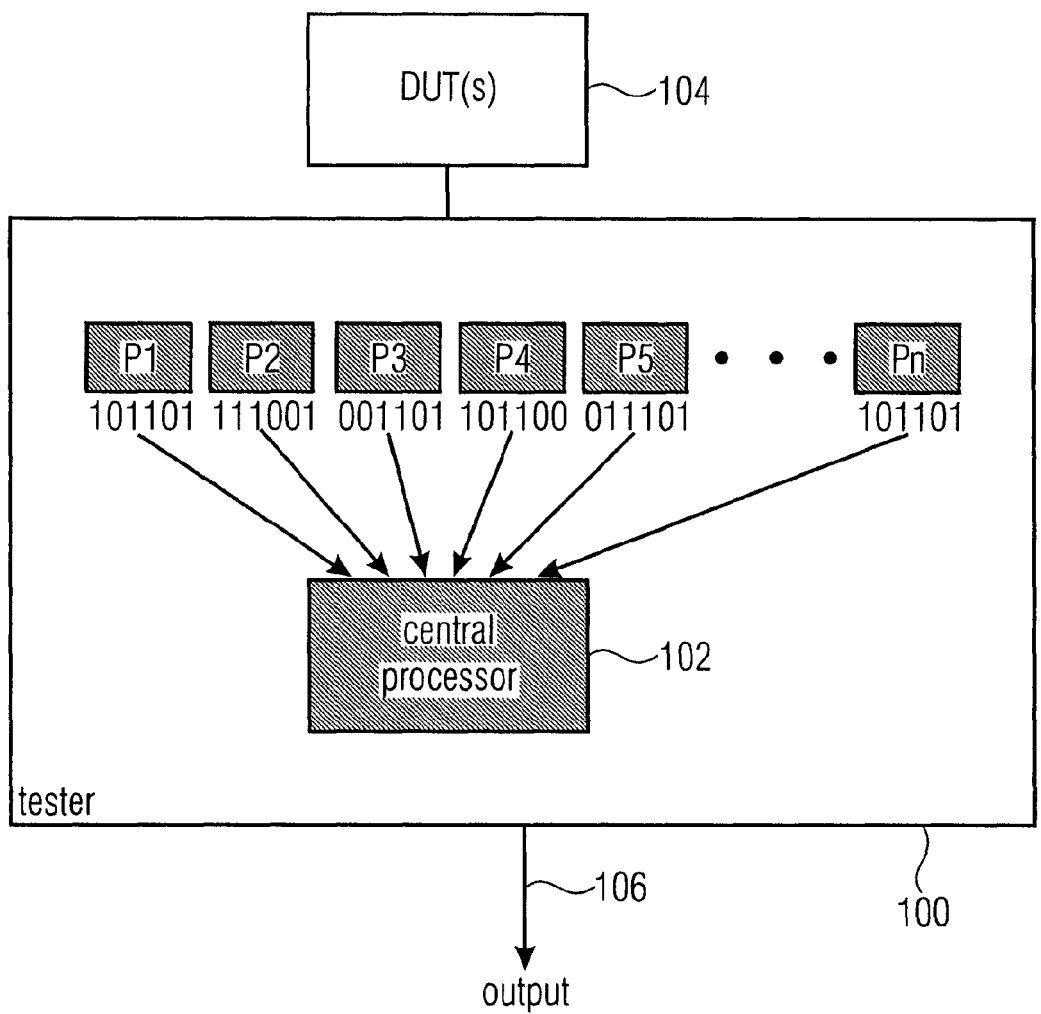
FIG. 1 shows a schematic view of a conventional tester.

FIG. 1 shows a schematic view of a tester 100 comprising a central processor 102 and a plurality of individual processors $P_1$ to $P_n$ which are coupled to the central processor 102 as is indicated by the respective arrows shown in FIG. 1 connecting the individual processors $P_1$ to $P_n$ with a central processor 102. The tester 100 may be connected or coupled to a single device under test or a plurality of devices under test as is indicated at 104. Further, the tester 100 comprises an output 106 for providing output signals which are for example indicative of the outcome of a test of the DUT 104. The plurality of processors $P_1$ to $P_n$ might be provided for providing the respective stimulus signals to the DUT 104, and in turn, for receiving from the DUT respective response signals. As indicated in FIG. 1, each processor $P_1$ to $P_n$, might hold one or more values in binary form representing a response signal or another signal indicating a test result of a test which was applied to the DUT 104 by means of a respective processor.

In the embodiment shown in FIG. 1, the individual processor $P_1$ stores the value of 45 in binary form (101101), the individual processor $P_2$ stores the value 57 in binary form (111001), the individual processor $P_3$ stores the value 13 in binary form (001101), the individual processor $P_4$ stores the value 44 in binary form (101100), the individual processor $P_5$ stores the value 29 (011101), and the individual processor $P_n$ stores the value 45 in binary form (101101).

In the above-described environment, the tester 100 comprises the front end processors $P_1$ to $P_n$, each of which holds an integer value. The central processor 102 may now need to know the minimum or maximum of all those values as fast as possible. In accordance with the conventional tester shown in FIG. 1, the conventional approach for finding the minimum or maximum of all values is to have the central processor 102 read the values from the processors $P_1$ to $P_n$ one by one, which in turn, will necessitate n read operations.

While the central processor 102, in general, can handle simple processing steps or computations quite fast, it is not possible to obtain the minimum or maximum of all values fast, as in general, the communication between the central processor 102 and the respective individual processor $P_1$ through $P_n$ is slow, compared to the just-mentioned computation, i.e., the number of communication steps needed dominates the total time needed, provided simple processing steps or computations are to be carried out in the central processor.

Figure 2:
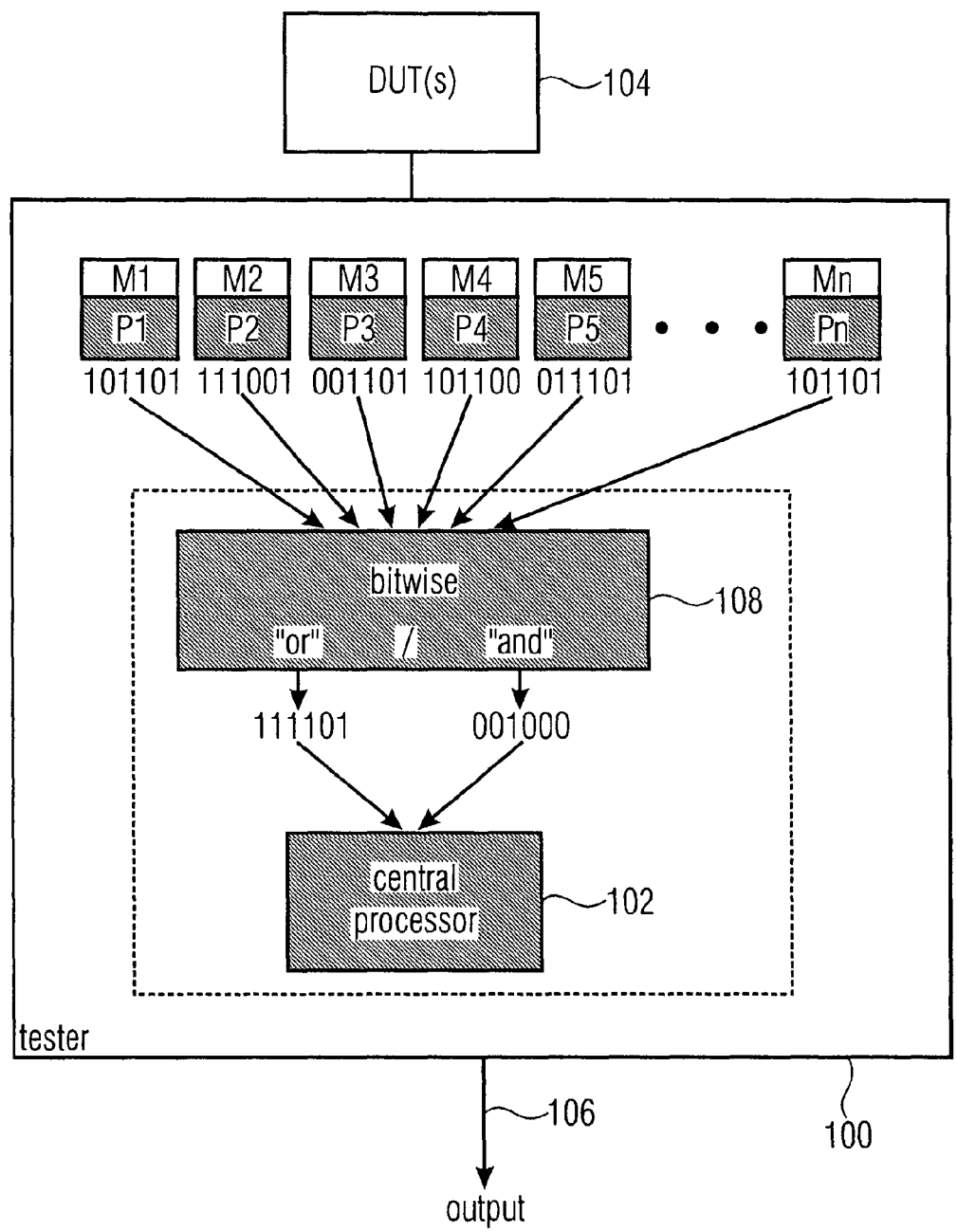
FIG. 2 shows a schematic view of a tester according to an embodiment of the invention.

Therefore, a need exists to provide an improved approach for determining from a plurality of binary values stored in the different locations, a minimum or maximum value in a processing and time efficient manner. The fast finding of one or more minimum/maximum value(s) may be used in a test system and, more specifically, for managing the memory of distributed processors of such a test system. One example of such a test system uses a plurality of channels (the measuring unit for one pin of DUT) each of which has its own test processor with associated memory. FIG. 2 shows a schematic view of a tester according to an embodiment of the invention. In FIG. 2 those elements already described with regard to FIG. 1 have associated therewith the same reference signs. As can be seen from FIG. 2, in addition to the tester described with regard to FIG. 1, the tester 100 comprises a logic 108 which is coupled between the respective individual processors $P_1$ to $P_n$ and the central processor 102. The logic 108 is shown as a separate element, however, other embodiments might implement the logic 108 as part of the central processor 102 as is indicated by the dashed line surrounding these two elements. As can be seen, the logic 108 is configured to combine the values read from the processors $P_1$ to $P_n$ using a bit-wise "AND" or a bit-wise "OR". The two outputs of the logic 108 are either the "bit-wise OR" or the "bit-wise AND" output, which is input into the central processor 102. In the embodiment shown in FIG. 2, it is assumed that the individual processors $P_1$ to $P_n$ hold the same values as described with regard to FIG. 1, and in addition, memory elements $M_1$ to $M_n$ are shown, which hold the values indicated. The memories $M_1$ to $M_n$ might either be part of the processor $P_1$ to $P_n$, e.g. as processor registers, or memory elements coupled to the respective processors. The functionality of the tester shown in FIG. 2 is such that the values can be read from all processors $P_1$ to $P_n$ into the central processor 102 in one step by combining the values read from the processors using the bit-wise "AND" or the bit-wise "OR". Using this common read operation on all processors is as fast as reading one value from one specific processor. In a similar manner, in one step data can be broadcast from the central processor to all other processors or to one individual processor.

In the following, examples for quickly determining the minimum or maximum of values stored in the distributed processor $P_1$ to $P_n$ using common read capabilities will be described with further reference to FIG. 3.

Figure 3:
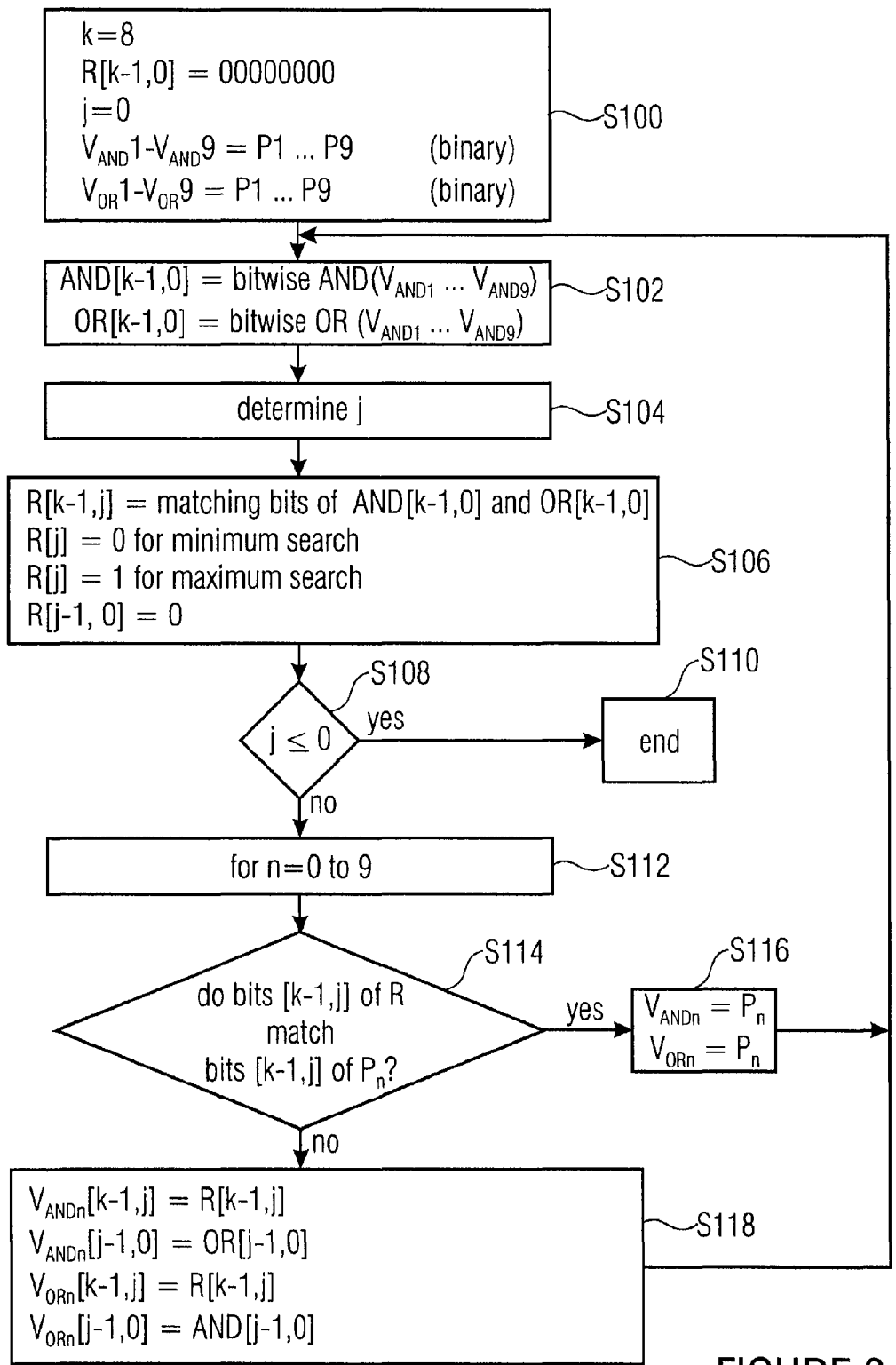
FIG. 3 shows a flow diagram illustrating an embodiment for determining a minimum/maximum of a plurality of binary values.

FIG. 3 shows a flow diagram of an embodiment for determining one or more minimum/maximum values associated with a plurality of processors $P_1$ to $P_n$. The original values are stored in each of the processors or may be stored elsewhere but are associated with one of the processors. The binary values comprise a number of bits which is set to be k, and the bits in the binary representation are numbered from right (least significant bit) to left (most significant bit), starting with 0, i.e., the number is represented as bits (k−1) . . . 0. i is the first bit position from the left (most significant bit) up to which the bits of the minimum are already known. In the example described with regard to FIG. 3, k=8, and initially i=k.

In step S100 the following variables are initialized:
k=8(=eight bits);
n=9(=nine processors);
R=variable in which the up to now known bits of the result for the determination of the minimum/maximum are stored, and in which the bits not known are set to 0;
j=highest bit position where bit-wise AND and bit-wise OR differ (counting least significant bit as 0);
$V_{ANDn}$=actual values for bit-wise AND;
$V_{ORn}$=actual values for bit-wise OR;
$P_n$=value stored at/associated with processor n After the initialization in step S100, a value for j which is smaller than i is determined such that bits (k−1) . . . (j+1) of the binary representation of all values provided from the processors $P_1$ to $P_n$ are equal. Then, bits (k−1) . . . (j+1) of the minimum/maximum value may be the same, and bit j of the minimum may be "0", and bit j of the maximum may be "1", respectively. To determine position j, the central processor 102 takes the bit-wise "AND" and the bit-wise "OR" obtained through two common read operations of the binary representations of the numbers of the processors (see step S102). At the bit positions where these two bit patterns are equal all values provided from the processors may be equal. At bit positions where these two bit patterns differ, at least one processor may have provided a 0-bit and at least one may have provided a 1-bit. Thus j is the most significant bit position where the bit-wise AND and the bit-wise OR differ, which can be computed in the central processor by simply examining the individual bits. After this step, bits (k−1) . . . j are known, i.e., i can be set to j (see step S104).

In step S106 the up to now known bits (k−1) to 0 for R are determined by setting bits k−1 to j+1 of R to the matching bits of the results of the bit-wise AND and bit-wise OR operation, setting bit j of R (if any) to 0 in case of search for the minimum and to 1 in case of search for the maximum, and setting the remaining bits j−1 to 0 of R (if any) to 0.

In step S108, it is determined whether j is smaller than or equal to 0. In case it is, the process ends at step S110.

Otherwise, the process proceeds to step S112, where the search is now restricted to those results where the bits (k−1) . . . i equal the already known bits of the smallest maximum. For preparing this step, the central processor 102 communicates the up to now known bits of the minimum/maximum to all processor $P_1$ to $P_n$ as well as the result of the bit-wise "AND" and the bit-wise "OR" of all values in the preceding iteration (in the first iteration the results of the bit-wise "AND" and the bit-wise "OR" of all original values stored in the processors). Further, the central processor 102 now instructs all processors $P_1$ to $P_n$ to provide the following values in the next step as follows (see steps S112 to S118):

in case bits (k−1) to j of the original value $P_n$ of a respective processor equals the already known bits of the minimum/maximum, the original value $P_n$ is provided (see steps 114 and 116), and for all other processors, the originally binary values are not provided, rather the processors are instructed to provide modified values to the logic 108 (see steps S114 and S118).

To be more specific, in step S118 the modified values are determined dependent on whether a common read with "AND"-operation or a common read with "OR"-operation is to be carried out. For the "common read with "AND"" operation the respective processors are instructed to return the up to now known bits of the minimum for bits (k−1) . . . i. In addition, also the bits of the preceding "OR" of the stored values are provided. In a similar manner, the processors are instructed to return respective modified values for the "common read with "OR"" operation. Again, the up to now known bits of the minimum bits (k−1) . . . i are returned, and the remaining bits are those of the "AND" of all preceding bits. The just-described modified values do not influence the bit-wise "AND" or the bit-wise "OR" over the values of the processors of the restricted search space.

The above process is repeated on the basis of the original/modified values until j≤0 (see steps 108, 110).

In the following examples will be described illustrating the above approach for determining a minimum/maximum value.

Example 1

Determining a minimum value from values stored in nine processors $P_1$ to $P_9$.
Original values:

| | | |
|---|---|---|
| $P_1 = 112$ | → | 01110000 |
| $P_2 = 114$ | → | 01110010 |
| $P_3 = 111$ | → | 01101111 |
| $P_4 = 99$ | → | 01100011 |
| $P_5 = 101$ | → | 01100101 |
| $P_6 = 115$ | → | 01110011 |
| $P_7 = 115$ | → | 01110011 |
| $P_8 = 111$ | → | 01101111 |
| $P_9 = 114$ | → | 01110010 |

Iteration #1

| | |
|---|---|
| Number of bits of result known up to now: | 0 |
| Bit Mask for bits known up to now: | 00000000 |
| Bits of result: | 00000000 |

Values given from each processor to the central processor in this iteration:

| For AND: ($P_1$ to $P_9$) | | For OR: ($P_1$ to $P_9$) | |
|---|---|---|---|
| 01110000 | original | 01110000 | original |
| 01110010 | original | 01110010 | original |
| 01101111 | original | 01101111 | original |
| 01101111 | original | 01101111 | original |
| 01100101 | original | 01100101 | original |
| 01110011 | original | 01110011 | original |
| 01110011 | original | 01110011 | original |
| 01101111 | original | 01101111 | original |
| 01110010 | original | 01110010 | original |
| 01100000(bit-wise AND) | | 01111111(bit-wise OR) | |

Highest bit position where bit-wise AND and bit-wise OR differ (counting least significant bit as 0): 4(j=4)
=> now the 4 most significant bits of the result are known.
Iteration #2

| | |
|---|---|
| Number of bits of result known up to now: | 4 |
| Bit Mask for bits known up to now: | 11110000 |
| Bits of result: | 01100000 |

Up to now known bits of result generated by:
bits k−1 to j+1 (bits 7 to 5)=matching bits of bit-wise AND and bit-wise OR in iteration #1—in this example 011.
setting bit j (bit 4) to 0 because of search for minimum.
remaining bits j−1 to 0 (bits 3 to 0) remain at 0.

| For AND: ($P_1$ to $P_9$) | |
|---|---|
| (01101111) | modified |
| (01101111) | modified |
| 01101111 | original |
| 01100011 | original |
| 01100101 | original |
| (01101111) | modified |
| (01101111) | modified |
| 01101111 | original |
| (01101111) | modified |
| Bit-wise AND: 01100001 | |

Original: Original value maintained because the up to now known bits of result, i.e. 0110, and the corresponding bits in original value match.
Modified: Original value modified because the up to now known bits of result, i.e. 0110, and the corresponding bits in original value do not match.
Those bits in the original value, which do not match, are replaced by the up to now known bits of result, i.e. 0110, and the remaining bits in the original value are replaced by the corresponding bits from the result of the bit-wise OR in iteration #1, i.e. 1111.

| For OR: ($P_1$ to $P_9$) | |
|---|---|
| (01100000) | modified |
| (01100000) | modified |
| 01101111 | original |
| 01100011 | original |
| 01100101 | original |
| (01100000) | modified |
| (01100000) | modified |
| 01101111 | original |
| (01100000) | modified |
| Bit-wise OR: 01101111 | |

Original: Original value maintained because the up to now known bits of result, i.e. 0110 and the corresponding bits in original value match.
Modified: Original value modified because the up to now known bits of result, i.e. 0110 and the corresponding bits in original value do not match.
Those bits in the original value, which do not match, are replaced by the up to now known bits of result, i.e. 0110 and the remaining bits in the original value are replaced by the corresponding bits from the result of the bit-wise AND in iteration #1, i.e. 0000.

Highest bit position where bit-wise AND and bit-wise OR differ (counting least significant bit as 0): 3 (j=3)
=> now the 5 most significant bits of the result are known.

Iteration #3

| | | |
|---|---:|---:|
| Number of bits of result known up to now: | | 5 |
| Bit Mask for bits known up to now: | | 11111000 |
| Bits of result: | | 01100000 |

Up to now known bits of result generated by:

bits k−1 to j+1 (bits 7 to 4)=matching bits of bit-wise AND and bit-wise OR in iteration #2—in this example 0110.

setting bit j (bit 3) to <u>0</u> because of search for maximum.

remaining bits j−1 to 0 (2 to 0) remain at 0.

| For AND: ($P_1$ to $P_9$) | | |
|---|---:|---|
| | (01100111) | modified |
| | (01100111) | modified |
| | (01100111) | modified |
| | 01100011 | original |
| | 01100101 | original |
| | (01100111) | modified |
| | (01100111) | modified |
| | (01100111) | modified |
| | (01100111) | modified |
| Bit-wise AND: | 01100001 | |

Original: Original value maintained because the up to now known bits of result, i.e. 0110<u>0</u> and the corresponding bits in original value match.

Modified: Original value modified because the up to now known bits of result, i.e. 0110<u>0</u> and the corresponding bits in original value do not match.

Those bits in the original value, which do not match, are replaced by the up to now known bits of result, i.e. 0110<u>0</u> and the remaining bits in the original value are replaced by the corresponding bits from the result of the bit-wise OR in iteration #2, i.e. 111

| For OR: ($P_1$ to $P_9$) | | |
|---|---:|---|
| | (01100000) | modified |
| | (01100000) | modified |
| | (01100000) | modified |
| | 01100011 | original |
| | 01100101 | original |
| | (01100000) | modified |
| | (01100000) | modified |
| | (01100000) | modified |
| | (01100000) | modified |
| Bit-wise OR: | 01100111 | |

Original: Original value maintained because the up to now known bits of result, i.e. 0110<u>0</u> and the corresponding bits in original value match.

Modified: Original value modified because the up to now known bits of result, i.e. 0110<u>0</u> and the corresponding bits in original value do not match.

Those bits in the original value, which do not match, are replaced by the up to now known bits of result, i.e. 0110<u>0</u> and the remaining bits in the original value are replaced by the corresponding bits from the result of the bit-wise AND in iteration #2, i.e. 000

Highest bit position where bit-wise AND and bit-wise OR differ (counting least significant bit as 0): 2(j=2)

=> now the 6 most significant bits of the result are known.

Iteration #4

| | | |
|---|---:|---:|
| Number of bits of result known up to now: | | 6 |
| Bit Mask for bits known up to now: | | 11111100 |
| Bits of result: | | 01100000 |

Up to now known bits of result generated by:

bits k−1 to j+1 (bits 7 to 3)=matching bits of bit-wise AND and bit-wise OR in iteration #3—in this example 01100.

setting bit j (bit 2) to <u>0</u> because of search for maximum.

remaining bits j−1 to 0 (1 to 0) remain at 0.

| For AND: ($P_1$ to $P_9$) | | |
|---|---:|---|
| | (01100011) | modified |
| | (01100011) | modified |
| | (01100011) | modified |
| | 01100011 | original |
| | (01100011) | modified |
| | (01100011) | modified |
| | (01100011) | modified |
| | (01100011) | modified |
| | (01100011) | modified |
| Bit-wise AND: | 01100011 | |

Original: Original value maintained because the up to now known bits of result, i.e. 01100<u>0</u> and the corresponding bits in original value match.

Modified: Original value modified because the up to now known bits of result, i.e. 01100<u>0</u> and the corresponding bits in original value do not match.

Those bits in the original value, which do not match, are replaced by the up to now known bits of result, i.e. 01100<u>0</u> and the remaining bits in the original value are replaced by the corresponding bits from the result of the bit-wise OR in iteration #3, i.e. 11

| For OR: ($P_1$ to $P_9$) | | |
|---|---:|---|
| | (01100000) | modified |
| | (01100000) | modified |
| | (01100000) | modified |
| | 01100011 | original |
| | (01100000) | modified |
| | (01100000) | modified |
| | (01100000) | modified |
| | (01100000) | modified |
| | (01100000) | modified |
| Bit-wise OR: | 01100011 | |

Original: Original value maintained because the up to now known bits of result, i.e. 01100<u>0</u> and the corresponding bits in original value match.

Modified: Original value modified because the up to now known bits of result, i.e. 01100<u>0</u> and the corresponding bits in original value do not match.

Those bits in the original value, which do not match, are replaced by the up to now known bits of result, i.e. 01100<u>0</u> and the remaining bits in the original value are replaced by the corresponding bits from the result of the bit-wise AND in iteration #3, i.e. 00

Highest bit position where bit-wise AND and bit-wise OR differ (counting least significant bit as 0): −1(j=−1)

=> now the 8 most significant bits of the result are known.

| | |
|---|---:|
| Bit Mask for bits known up to now: | 11111111 |
| Bits of result: | 01100011 |

Up to now known bits of result generated by:

bits k−1 to j+1 (bits 7 to 1)=matching bits of bit-wise AND and bit-wise OR in iteration #4—in this example 01100011.

bit j (bit −1) does not exist.

there are no remaining bits j−1 to 0.

=> now all bits of the result are known, i.e. the result is 01100011=99. Thus, processor $P_4$ holds the minimum value.

Example 2

Determining a maximum value from values stored in nine processors $P_1$ to $P_9$.

Original values:

| | | |
|---|---|---|
| $P_1 = 112$ | → | 01110000 |
| $P_2 = 114$ | → | 01110010 |
| $P_3 = 111$ | → | 01101111 |
| $P_4 = 99$ | → | 01100011 |
| $P_5 = 101$ | → | 01100101 |
| $P_6 = 115$ | → | 01110011 |
| $P_7 = 115$ | → | 01110011 |
| $P_8 = 111$ | → | 01101111 |
| $P_9 = 114$ | → | 01110010 |

Iteration #1

| | |
|---|---|
| Number of bits of result known up to now: | 0 |
| Bit Mask for bits known up to now: | 00000000 |
| Bits of result: | 00000000 |

Values given from each processor to the central processor in this iteration:

| For AND: ($P_1$ to $P_9$) | | For OR: ($P_1$ to $P_9$) | |
|---|---|---|---|
| 01110000 | original | 01110000 | original |
| 01110010 | original | 01110010 | original |
| 01101111 | original | 01101111 | original |
| 01100011 | original | 01100011 | original |
| 01100101 | original | 01100101 | original |
| 01110011 | original | 01110011 | original |
| 01110011 | original | 01110011 | original |
| 01101111 | original | 01101111 | original |
| 01110010 | original | 01110010 | original |
| 01100000(bit-wise AND) | | 01111111(bit-wise OR) | |

Highest bit position where bit-wise AND and bit-wise OR differ (counting least significant bit as 0): 4(j=4)

=> now the 4 most significant bits of the result are known.

Iteration #2

| | |
|---|---|
| Number of bits of result known up to now: | 4 |
| Bit Mask for bits known up to now: | 11110000 |
| Bits of result: | 01110000 |

Up to now known bits of result generated by:

bits k−1 to j+1 (bits 7 to 5)=matching bits of bit-wise AND and bit-wise OR in iteration #1—in this example 011.

setting bit j (bit 4) to 1 because of search for maximum.

remaining bits j−1 to 0 (bits 3 to 0) remain at 0.

| For AND: ($P_1$ to $P_9$) | |
|---|---|
| 01110000 | original |
| 01110010 | original |
| (01111111) | modified |
| (01111111) | modified |
| (01111111) | modified |
| 01110011 | original |
| 01110011 | original |
| (01111111) | modified |
| 01110010 | original |
| Bit-wise AND: 01110000 | |

Original: Original value maintained because the up to now known bits of result, i.e. 0111, and the corresponding bits in original value match.

Modified: Original value modified because the up to now known bits of result, i.e. 0111, and the corresponding bits in original value do not match.

Those bits in the original value, which do not match, are replaced by the up to now known bits of result, i.e. 0111, and the remaining bits in the original value are replaced by the corresponding bits from the result of the bit-wise OR in iteration #1, i.e. 1111.

| For OR: ($P_1$ to $P_9$) | |
|---|---|
| 01110000 | original |
| 01110010 | original |
| (01110000) | modified |
| (01110000) | modified |
| (01110000) | modified |
| 01110011 | original |
| 01110011 | original |
| (01110000) | modified |
| 01110010 | original |
| Bit-wise OR: 01110011 | |

Original: Original value maintained because the up to now known bits of result, i.e. 0111, and the corresponding bits in original value match.

Modified: Original value modified because the up to now known bits of result, i.e. 0111, and the corresponding bits in original value do not match.

Those bits in the original value, which do not match, are replaced by the up to now known bits of result, i.e. 0111, and the remaining bits in the original value are replaced by the corresponding bits from the result of the bit-wise AND in iteration #1, i.e. 0000.

Highest bit position where bit-wise AND and bit-wise OR differ (counting least significant bit as 0): 1(j=1)

=> now the 7 most significant bits of the result are known.

Iteration #3

| | |
|---|---|
| Number of bits of result known up to now: | 7 |
| Bit Mask for bits known up to now: | 11111110 |
| Bits of result: | 01110010 |

Up to now known bits of result generated by:

bits k−1 to j+1 (bits 7 to 2)=matching bits of bit-wise AND and bit-wise OR in iteration #2—in this example 011100.

setting bit j (bit 1) to 1 because of search for maximum.

remaining bits j−1 to 0 (0 to 0) remain at 0.

13

| For AND: ($P_1$ to $P_9$) | |
|---|---|
| (01110011) | modified |
| 01110010 | original |
| (01110011) | modified |
| (01110011) | modified |
| (01110011) | modified |
| 01110011 | original |
| 01110011 | original |
| (01110011) | modified |
| 01110010 | original |
| Bit-wise AND: 01110010 | |

Original: Original value maintained because the up to now known bits of result, i.e. 011100<u>1</u>, and the corresponding bits in original value match.

Modified: Original value modified because the up to now known bits of result, i.e. 011100<u>1</u>, and the corresponding bits in original value do not match.

Those bits in the original value, which do not match, are replaced by the up to now known bits of result, i.e. 011100<u>1</u>, and the remaining bits in the original value are replaced by the corresponding bits from the result of the bit-wise OR in iteration #2, i.e. 1.

| For OR: ($P_1$ to $P_9$) | |
|---|---|
| (01110010) | modified |
| 01110010 | original |
| (01110010) | modified |
| (01110010) | modified |
| (01110010) | modified |
| 01110011 | original |
| 01110011 | original |
| (01110010) | modified |
| 01110010 | original |
| Bit-wise OR: 01110011 | |

Original: Original value maintained because the up to now known bits of result, i.e. 011100<u>1</u>, and the corresponding bits in original value match.

Modified: Original value modified because the up to now known bits of result, i.e. 011100<u>1</u>, and the corresponding bits in original value do not match.

Those bits in the original value, which do not match, are replaced by the up to now known bits of result, i.e. 011100<u>1</u>, and the remaining bits in the original value are replaced by the corresponding bits from the result of the bit-wise AND in iteration #2, i.e. 0.

Highest bit position where bit-wise AND and bit-wise OR differ (counting least significant bit as 0): 0(j=0)
=> now the 8 most significant bits of the result are known.

| Bit Mask for bits known up to now: | 11111111 |
|---|---|
| Bits of result: | 01100011 |

Up to now known bits of result generated by:
bits k−1 to j+1 (bits 7 to 1)=matching bits of bit-wise AND and bit-wise OR in iteration #4—in this example 011100<u>1</u>.
setting bit j (bit 0) to <u>1</u> because of search for maximum.
there are no remaining bits j−1 to 0.
=> now all bits of the result are known, i.e. the result is 01110011=115. Thus, processor $P_7$ holds the minimum value.

14

Example 3

Determining a minimum value from values stored in eleven processors $P_1$ to $P_{11}$. (As to the determination of the values for the bit-wise AND and bit-wise OR please see above examples 1 and 2)

Original values:

| $P_1$ = 70 | → | 01000110 |
|---|---|---|
| $P_2$ = 97 | → | 01100001 |
| $P_3$ = 115 | → | 01110011 |
| $P_4$ = 116 | → | 01110100 |
| $P_5$ = 77 | → | 01001101 |
| $P_6$ = 105 | → | 01101001 |
| $P_7$ = 110 | → | 01101110 |
| $P_8$ = 68 | → | 01000100 |
| $P_9$ = 101 | → | 01100101 |
| $P_{10}$ = 109 | → | 01101101 |
| $P_{11}$ = 111 | → | 01101111 |

Iteration #1

| Number of bits of result R known up to now: | 0 |
|---|---|
| Bit Mask for bits known up to now: | 00000000 |
| Bits of result: | 00000000 |

Values given from each processor to the central processor in this iteration:

| For AND: ($P_1$ to $P_{11}$) | | For OR: ($P_1$ to $P_{11}$) | |
|---|---|---|---|
| 01000110 | original | 01000110 | original |
| 01100001 | original | 01100001 | original |
| 01110011 | original | 01110011 | original |
| 01110100 | original | 01110100 | original |
| 01001101 | original | 01001101 | original |
| 01101001 | original | 01101001 | original |
| 01101110 | original | 01101110 | original |
| 01000100 | original | 01000100 | original |
| 01100101 | original | 01100101 | original |
| 01101101 | original | 01101101 | original |
| 01101111 | original | 01101111 | original |
| 01000000(bit-wise AND) | | 01111111(bit-wise OR) | |

Highest bit position where bit-wise AND and bit-wise OR differ (counting least significant bit as 0): 5(j=5)
=> now the 3 most significant bits of the result are known.

Iteration #2

| Number of bits of result known up to now: | 3 |
|---|---|
| Bit Mask for bits known up to now: | 11100000 |
| Bits of result: | 01000000 |

Up to now known bits of result generated by:
bits k−1 to j+1 (bits 7 to 6)=matching bits of bit-wise AND and bit-wise OR in iteration #1—in this example 01.
setting bit j (bit 5) to <u>0</u> because of search for minimum.
remaining bits j−1 to 0 (bits 4 to 0) remain at 0.

| For AND: ($P_1$ to $P_{11}$) | | For OR: ($P_1$ to $P_{11}$) | |
|---|---|---|---|
| 01000110 | original | 01000110 | original |
| (01011111) | modified | (01000000) | modified |
| (01011111) | modified | (01000000) | modified |
| (01011111) | modified | (01000000) | modified |
| 01001101 | original | 01001101 | original |
| (01011111) | modified | (01000000) | modified |

-continued

| For AND: ($P_1$ to $P_{11}$) | | For OR: ($P_1$ to $P_{11}$) | |
|---|---|---|---|
| (01011111) | modified | (01000000) | modified |
| 01000100 | original | 01000100 | original |
| (01011111) | modified | (01000000) | modified |
| (01011111) | modified | (01000000) | modified |
| (01011111) | modified | (01000000) | modified |
| 01000100(bit-wise AND) | | 01001111(bit-wise OR) | |

Highest bit position where bit-wise AND and bit-wise OR differ (counting least significant bit as 0): 3(j=3)
=> now the 5 most significant bits of the result are known.
Iteration #3

| Number of bits of result known up to now: | 5 |
|---|---|
| Bit Mask for bits known up to now: | 11111000 |
| Bits of result: | 01000000 |

Up to now known bits of result generated by:
bits k−1 to j+1 (bits 7 to 4)=matching bits of bit-wise AND and bit-wise OR in iteration #2—in this example 0100.
setting bit j (bit 3) to <u>0</u> because of search for minimum.
remaining bits j−1 to 0 (2 to 0) remain at 0.

| For AND: ($P_1$ to $P_{11}$) | | For OR: ($P_1$ to $P_{11}$) | |
|---|---|---|---|
| 01000110 | original | 01000110 | original |
| (01000111) | modified | (01000000) | modified |
| (01000111) | modified | (01000000) | modified |
| (01000111) | modified | (01000000) | modified |
| (01000111) | modified | (01000000) | modified |
| (01000111) | modified | (01000000) | modified |
| 01000100 | original | 01000100 | original |
| (01000111) | modified | (01000000) | modified |
| (01000111) | modified | (01000000) | modified |
| (01000111) | modified | (01000000) | modified |
| 01000100(bit-wise AND) | | 01000110(bit-wise OR) | |

Highest bit position where bit-wise AND and bit-wise OR differ (counting least significant bit as 0): 1 (j=1)
=> now the 7 most significant bits of the result are known.
Iteration #4

| Number of bits of result known up to now: | 7 |
|---|---|
| Bit Mask for bits known up to now: | 11111110 |
| Bits of result: | 01000100 |

Up to now known bits of result generated by:
bits k−1 to j+1 (bits 7 to 2)=matching bits of bit-wise AND and bit-wise OR in iteration #3—in this example 01100.
setting bit j (bit 1) to <u>0</u> because of search for minimum.
remaining bits j−1 to 0 (0 to 0) remain at 0.

| For AND: ($P_1$ to $P_{11}$) | | For OR: ($P_1$ to $P_{11}$) | |
|---|---|---|---|
| (01000101) | modified | (01000100) | modified |
| (01000101) | modified | (01000100) | modified |
| (01000101) | modified | (01000100) | modified |
| (01000101) | modified | (01000100) | modified |
| (01000101) | modified | (01000100) | modified |
| (01000101) | modified | (01000100) | modified |
| (01000101) | modified | (01000100) | modified |
| 01000100 | original | 01000100 | original |
| (01000101) | modified | (01000100) | modified |
| (01000101) | modified | (01000100) | modified |

| For AND: ($P_1$ to $P_{11}$) | | For OR: ($P_1$ to $P_{11}$) | |
|---|---|---|---|
| (01000101) | modified | (01000100) | modified |
| 01000100(bit-wise AND) | | 01000100(bit-wise OR) | |

Highest bit position where bit-wise AND and bit-wise OR differ (counting least significant bit as 0): −1(j=−1) (i.e. all bits match)

| Number of bits of result known up to now: | 8 |
|---|---|
| Bit Mask for bits known up to now: | 11111111 |
| Bits of result: | 01000100 |

Up to now known bits of result generated by:
bits k−1 to j+1 (bits 7 to 0)=matching bits of bit-wise AND and bit-wise OR in iteration #4—in this example 01000100.
bit j (bit −1) does not exist.
there are no remaining bits j−1 to 0.
=> all bits of the result are known, i.e. the result is 01000100=68. Thus, processor $P_7$ holds the minimum value.

Example 4

Determining a maximum value from values stored in eleven processors $P_1$ to $P_{11}$. (As to the determination for the values for the bit-wise AND and bit-wise OR please see above examples 1 and 2)
Original values:

| $P_1$ = 70 | → | 01000110 |
|---|---|---|
| $P_2$ = 97 | → | 01100001 |
| $P_3$ = 115 | → | 01110011 |
| $P_4$ = 116 | → | 01110100 |
| $P_5$ = 77 | → | 01001101 |
| $P_6$ = 105 | → | 01101001 |
| $P_7$ = 110 | → | 01101110 |
| $P_8$ = 68 | → | 01000100 |
| $P_9$ = 101 | → | 01100101 |
| $P_{10}$ = 109 | → | 01101101 |
| $P_{11}$ = 111 | → | 01101111 |

Iteration #1

| Number of bits of result known up to now: | 0 |
|---|---|
| Bit Mask for bits known up to now: | 00000000 |
| Bits of result: | 00000000 |

Values given from each processor to the central processor in this iteration:

| For AND: ($P_1$ to $P_{11}$) | | For OR: ($P_1$ to $P_{11}$) | |
|---|---|---|---|
| 01000110 | original | 01000110 | original |
| 01100001 | original | 01100001 | original |
| 01110011 | original | 01110011 | original |
| 01110100 | original | 01110100 | original |
| 01001101 | original | 01001101 | original |
| 01101001 | original | 01101001 | original |
| 01101110 | original | 01101110 | original |
| 01000100 | original | 01000100 | original |
| 01100101 | original | 01100101 | original |
| 01101101 | original | 01101101 | original |
| 01101111 | original | 01101111 | original |
| 01000000(bit-wise AND) | | 01111111(bit-wise OR) | |

Highest bit position where bit-wise AND and bit-wise OR differ (counting least significant bit as 0): 5(j=5)
=> the 3 most significant bits of the result are known.
Iteration #2

| Number of bits of result known up to now: | 3 |
|---|---|
| Bit Mask for bits known up to now: | 11100000 |
| Bits of result: | 01100000 |

Up to now known bits of result generated by:
bits k−1 to j+1 (bits 7 to 6)=matching bits of bit-wise AND and bit-wise OR in iteration #1—in this example 01.
setting bit j (bit 5) to 1 because of search for maximum.
remaining bits j−1 to $\overline{0}$ (bits 4 to 0) remain at 0.

| For AND: ($P_1$ to $P_{11}$) | | For OR: ($P_1$ to $P_{11}$) | |
|---|---|---|---|
| (01111111) | modified | (01100000) | modified |
| 01100001 | original | 01100001 | original |
| 01110011 | original | 01110011 | original |
| 01110100 | original | 01110100 | original |
| (01111111) | modified | (01100000) | modified |
| 01101001 | original | 01101001 | original |
| 01101110 | original | 01101110 | original |
| (01111111) | modified | (01100000) | modified |
| 01100101 | original | 01100101 | original |
| 01101101 | original | 01101101 | original |
| 01101111 | original | 01101111 | original |
| 01100000(bit-wise AND) | | 01111111(bit-wise OR) | |

Highest bit position where bit-wise AND and bit-wise OR differ (counting least significant bit as 0): 4(j=4)
=> the 4 most significant bits of the result are known.
Iteration #3

| Number of bits of result known up to now: | 4 |
|---|---|
| Bit Mask for bits known up to now: | 11110000 |
| Bits of result: | 01110000 |

Up to now known bits of result generated by:
bits k−1 to j+1 (bits 7 to 5)=matching bits of bit-wise AND and bit-wise OR in iteration #2—in this example 011.
setting bit j (bit 4) to 1 because of search for maximum.
remaining bits j−1 to $\overline{0}$ (3 to 0) remain at 0.

| For AND: ($P_1$ to $P_{11}$) | | For OR: ($P_1$ to $P_{11}$) | |
|---|---|---|---|
| (01111111) | modified | (01110000) | modified |
| (01111111) | modified | (01110000) | modified |
| 01110011 | original | 01110011 | original |
| 01110100 | original | 01110100 | original |
| (01111111) | modified | (01110000) | modified |
| (01111111) | modified | (01110000) | modified |
| (01111111) | modified | (01110000) | modified |
| (01111111) | modified | (01110000) | original |
| (01111111) | modified | (01110000) | modified |
| (01111111) | modified | (01110000) | modified |
| (01111111) | modified | (01110000) | modified |
| Bit-wise AND: 01110000 | | 01110111(bit-wise OR) | |

Highest bit position where bit-wise AND and bit-wise OR differ (counting least significant bit as 0): 2(j=2)
=> the 6 most significant bits of the result are known.
Iteration #4

| Number of bits of result known up to now: | 6 |
|---|---|
| Bit Mask for bits known up to now: | 11111100 |
| Bits of result: | 01110100 |

Up to now known bits of result generated by:
bits k−1 to j+1 (bits 7 to 3)=matching bits of bit-wise AND and bit-wise OR in iteration #3—in this example 01110.
setting bit j (bit 2) to 1 because of search for maximum.
remaining bits j−1 to 0 (1 to 0) remain at 0.

| For AND: ($P_1$ to $P_{11}$) | | For OR: ($P_1$ to $P_{11}$) | |
|---|---|---|---|
| (01110111) | modified | (01110100) | modified |
| (01110111) | modified | (01110100) | modified |
| (01110111) | modified | (01110100) | modified |
| 01110100 | original | 01110100 | original |
| (01110111) | modified | (01110100) | modified |
| (01110111) | modified | (01110100) | modified |
| (01110111) | modified | (01110100) | modified |
| (01110111) | modified | (01110100) | modified |
| (01110111) | modified | (01110100) | modified |
| (01110111) | modified | (01110100) | modified |
| (01110111) | modified | (01110100) | modified |
| 01110100(bit-wise AND) | | 01110100(bit-wise OR) | |

Highest bit position where bit-wise AND and bit-wise OR differ (counting least significant bit as 0): −1(j=−1) (i.e. all bits match)

| Number of bits of result known up to now: | 8 |
|---|---|
| Bit Mask for bits known up to now: | 11111111 |
| Bits of result: | 01110100 |

Up to now known bits of result generated by:
bits k−1 to j+1 (bits 7 to 0)=matching bits of bit-wise AND and bit-wise OR in iteration #4—in this example 01110100.
bit j (bit −1) does not exist.
there are no remaining bits j−1 to 0.
=> all bits of the result are known, i.e. the result is 01110100=116. Thus, processor $P_4$ holds the minimum value.

Example 5

Determining a minimum value from values stored in eighteen processors $P_1$ to $P_{18}$. (As to the determination for the values for the bit-wise AND and bit-wise OR please see above examples 1 and 2)

Original values:

| $P_1 = 114$ | → | 01110010 |
|---|---|---|
| $P_2 = 104$ | → | 01101000 |
| $P_3 = 97$ | → | 01100001 |
| $P_4 = 98$ | → | 01100010 |
| $P_5 = 97$ | → | 01100001 |
| $P_6 = 114$ | → | 01110010 |
| $P_7 = 98$ | → | 01100010 |
| $P_8 = 101$ | → | 01100101 |
| $P_9 = 114$ | → | 01110010 |
| $P_{10} = 114$ | → | 01110010 |
| $P_{11} = 104$ | → | 01101000 |
| $P_{12} = 97$ | → | 01100001 |
| $P_{13} = 98$ | → | 01100010 |
| $P_{14} = 97$ | → | 01100001 |
| $P_{15} = 114$ | → | 01110010 |
| $P_{16} = 98$ | → | 01100010 |
| $P_{17} = 101$ | → | 01100101 |
| $P_{18} = 114$ | → | 01110010 |

Iteration #1

| Number of bits of result known up to now: | 0 |
|---|---|
| Bit Mask for bits known up to now: | 00000000 |
| Bits of result: | 00000000 |

Values given from each processor to the central processor in this iteration:

| For AND: ($P_1$ to $P_{18}$) | | For OR: ($P_1$ to $P_{18}$) | |
|---|---|---|---|
| 01110010 | original | 01110010 | original |
| 01101000 | original | 01101000 | original |
| 01100001 | original | 01100001 | original |
| 01100010 | original | 01100010 | original |
| 01100001 | original | 01100001 | original |
| 01110010 | original | 01110010 | original |
| 01100010 | original | 01100010 | original |
| 01100101 | original | 01100101 | original |
| 01110010 | original | 01110010 | original |
| 01110010 | original | 01110010 | original |
| 01101000 | original | 01101000 | original |
| 01100001 | original | 01100001 | original |
| 01100010 | original | 01100010 | original |
| 01100001 | original | 01100001 | original |
| 01110010 | original | 01110010 | original |
| 01100010 | original | 01100010 | original |
| 01100101 | original | 01100101 | original |
| 01110010 | original | 01110010 | original |
| 01100000(bit-wise AND) | | 01111111(bit-wise OR) | |

Highest bit position where bit-wise AND and bit-wise OR differ (counting least significant bit as 0): 4(j=4)
=> the 4 most significant bits of the result are known.

Iteration #2

| Number of bits of result known up to now: | 4 |
|---|---|
| Bit Mask for bits known up to now: | 11110000 |
| Bits of result: | 01100000 |

Up to now known bits of result generated by:
bits k−1 to j+1 (bits 7 to 5)=matching bits of bit-wise AND and bit-wise OR in iteration #1—in this example 011.
setting bit j (bit 4) to <u>0</u> because of search for minimum.
remaining bits j−1 to 0 (bits 3 to 0) remain at 0.

| For AND: ($P_1$ to $P_{18}$) | | For OR: ($P_1$ to $P_{18}$) | |
|---|---|---|---|
| (01101111) | modified | (01100000) | modified |
| 01101000 | original | 01101000 | original |
| 01100001 | original | 01100001 | original |
| 01100010 | original | 01100010 | original |
| 01100001 | original | 01100001 | original |
| (01101111) | modified | (01100000) | modified |
| 01100010 | original | 01100010 | original |
| 01100101 | original | 01100101 | original |
| (01101111) | modified | (01100000) | modified |
| (01101111) | modified | (01100000) | modified |
| 01101000 | original | 01101000 | original |
| 01100001 | original | 01100001 | original |
| 01100010 | original | 01100010 | original |
| 01100001 | original | 01100001 | original |
| (01101111) | modified | (01100000) | modified |
| 01100010 | original | 01100010 | original |
| 01100101 | original | 01100101 | original |
| (01101111) | modified | (01100000) | modified |
| 01100000(bit-wise AND) | | 01101111(bit-wise OR) | |

Highest bit position where bit-wise AND and bit-wise OR differ (counting least significant bit as 0): 3(j=3)
=> the 5 most significant bits of the result are known.

Iteration #3

| Number of bits of result known up to now: | 5 |
|---|---|
| Bit Mask for bits known up to now: | 11111000 |
| Bits of result: | 01100000 |

Up to now known bits of result generated by:
bits k−1 to j+1 (bits 7 to 4)=matching bits of bit-wise AND and bit-wise OR in iteration #2—in this example 0110.
setting bit j (bit 3) to <u>0</u> because of search for minimum.
remaining bits j−1 to 0 (2 to 0) remain at 0.

| For AND: ($P_1$ to $P_{18}$) | | For OR: ($P_1$ to $P_{18}$) | |
|---|---|---|---|
| (01100111) | modified | (01100000) | original |
| (01100111) | modified | (01100000) | modified |
| 01100001 | original | 01100001 | modified |
| 01100010 | original | 01100010 | modified |
| 01100001 | original | 01100001 | modified |
| (01100111) | modified | (01100000) | modified |
| 01100010 | original | 01100010 | modified |
| 01100101 | original | 01100101 | original |
| (01100111) | modified | (01100000) | modified |
| (01100111) | modified | (01100000) | modified |
| (01100111) | modified | (01100000) | modified |
| 01100001 | original | 01100001 | modified |
| 01100010 | original | 01100010 | modified |
| 01100001 | original | 01100001 | modified |
| (01100111) | modified | (01100000) | original |
| 01100010 | original | 01100010 | modified |
| 01100101 | original | 01100101 | modified |
| (01100111) | modified | (01100000) | modified |
| 01100000(bit-wise AND) | | 01100111(bit-wise OR) | |

Highest bit position where bit-wise AND and bit-wise OR differ (counting least significant bit as 0): 2(j=2)
=> the 6 most significant bits of the result are known.

Iteration #4

| Number of bits of result known up to now: | 6 |
|---|---|
| Bit Mask for bits known up to now: | 11111100 |
| Bits of result: | 01100000 |

Up to now known bits of result generated by:
bits k−1 to j+1 (bits 7 to 3)=matching bits of bit-wise AND and bit-wise OR in iteration #3—in this example 01100.
setting bit j (bit 2) to <u>0</u> because of search for minimum.
remaining bits j−1 to 0 (1 to 0) remain at 0.

| For AND: ($P_1$ to $P_{18}$) | | For OR: ($P_1$ to $P_{18}$) | |
|---|---|---|---|
| (01100011) | modified | (01100000) | modified |
| (01100011) | modified | (01100000) | modified |
| 01100001 | original | 01100001 | original |
| 01100010 | original | 01100010 | original |
| 01100001 | original | 01100001 | original |
| (01100011) | modified | (01100000) | modified |
| 01100010 | original | 01100010 | original |
| (01100011) | modified | (01100000) | modified |
| (01100011) | modified | (01100000) | modified |
| (01100011) | modified | (01100000) | modified |
| (01100011) | modified | (01100000) | modified |
| 01100001 | original | 01100001 | original |
| 01100010 | original | 01100010 | original |
| 01100001 | original | 01100001 | original |
| (01100011) | modified | (01100000) | modified |
| 01100010 | original | 01100010 | original |
| (01100011) | modified | (01100000) | modified |
| (01100011) | modified | (01100000) | modified |
| 01100000(bit-wise AND) | | 01100011(bit-wise OR) | |

Highest bit position where bit-wise AND and bit-wise OR differ (counting least significant bit as 0): 1(j=1)
=> the 7 most significant bits of the result are known.
Iteration #5

| | |
|---|---|
| Number of bits of result known up to now: | 7 |
| Bit Mask for bits known up to now: | 11111110 |
| Bits of result: | 01100000 |

Up to now known bits of result generated by:
bits k−1 to j+1 (bits 7 to 2)=matching bits of bit-wise AND and bit-wise OR in iteration #4—in this example 011000.
setting bit j (bit 1) to <u>0</u> because of search for minimum.
remaining bits j−1 to 0 (0 to 0) remain at 0.

| For AND: ($P_1$ to $P_{18}$) | | For OR: ($P_1$ to $P_{18}$) | |
|---|---|---|---|
| (01100001) | modified | (01100000) | modified |
| (01100001) | modified | (01100000) | modified |
| 01100001 | original | 01100001 | original |
| (01100001) | modified | (01100000) | modified |
| 01100001 | original | 01100001 | original |
| (01100001) | modified | (01100000) | modified |
| (01100001) | modified | (01100000) | modified |
| (01100001) | modified | (01100000) | modified |
| (01100001) | modified | (01100000) | modified |
| (01100001) | modified | (01100000) | modified |
| (01100001) | modified | (01100000) | modified |
| 01100001 | original | 01100001 | original |
| (01100001) | modified | (01100000) | modified |
| 01100001 | original | 01100001 | original |
| (01100001) | modified | (01100000) | original |
| (01100001) | modified | (01100000) | modified |
| (01100001) | modified | (01100000) | modified |
| (01100001) | modified | (01100000) | modified |
| 01100001(bit-wise AND) | | 01100001(bit-wise OR) | |

Highest bit position where bit-wise AND and bit-wise OR differ (counting least significant bit as 0): −1 (j=−1) (i.e. all bits match)

| | |
|---|---|
| Number of bits of result known up to now: | 8 |
| Bit Mask for bits known up to now: | 11111111 |
| Bits of result: | 01100001 |

Up to now known bits of result generated by:
bits k−1 to j+1 (bits 7 to 0)=matching bits of bit-wise AND and bit-wise OR in iteration #4—in this example 01100001.
bit j (bit −1) does not exist.
there are no remaining bits j−1 to 0.
=> all bits of the result are known, i.e. the result is 01100001=97. Thus, processors $P_3$, $P_5$, $P_{12}$ hold the minimum value.

Example 6

Determining a maximum value from values stored in eighteen processors $P_1$ to $P_{18}$. (As to the determination for the values for the bit-wise AND and bit-wise OR please see above examples 1 and 2)
Original values:

| | | |
|---|---|---|
| $P_1$ = 114 | → | 01110010 |
| $P_2$ = 104 | → | 01101000 |
| $P_3$ = 97 | → | 01100001 |
| $P_4$ = 98 | → | 01100010 |
| $P_5$ = 97 | → | 01100001 |
| $P_6$ = 114 | → | 01110010 |
| $P_7$ = 98 | → | 01100010 |
| $P_8$ = 101 | → | 01100101 |
| $P_9$ = 114 | → | 01110010 |
| $P_{10}$ = 114 | → | 01110010 |
| $P_{11}$ = 104 | → | 01101000 |
| $P_{12}$ = 97 | → | 01100001 |
| $P_{13}$ = 98 | → | 01100010 |
| $P_{14}$ = 97 | → | 01100001 |
| $P_{15}$ = 114 | → | 01110010 |
| $P_{16}$ = 98 | → | 01100010 |
| $P_{17}$ = 101 | → | 01100101 |
| $P_{18}$ = 114 | → | 01110010 |

Iteration #1

| | |
|---|---|
| Number of bits of result known up to now: | 0 |
| Bit Mask for bits known up to now: | 00000000 |
| Bits of result: | 00000000 |

Values given from each processor to the central processor in this iteration:

| For AND: ($P_1$ to $P_{18}$) | | For OR: ($P_1$ to $P_{18}$) | |
|---|---|---|---|
| 01110010 | original | 01110010 | original |
| 01101000 | original | 01101000 | original |
| 01100001 | original | 01100001 | original |
| 01100010 | original | 01100010 | original |
| 01100001 | original | 01100001 | original |
| 01110010 | original | 01110010 | original |
| 01100010 | original | 01100010 | original |
| 01100101 | original | 01100101 | original |
| 01110010 | original | 01110010 | original |
| 01110010 | original | 01110010 | original |
| 01101000 | original | 01101000 | original |
| 01100001 | original | 01100001 | original |
| 01100010 | original | 01100010 | original |
| 01100001 | original | 01100001 | original |
| 01110010 | original | 01110010 | original |
| 01100010 | original | 01100010 | original |
| 01100101 | original | 01100101 | original |
| 01110010 | original | 01110010 | original |
| Bit-wise AND: 01100000 | | Bit-wise OR: 01111111 | |

Highest bit position where bit-wise AND and bit-wise OR differ (counting least significant bit as 0): 4(j=4)
=> the 4 most significant bits of the result are known.
Iteration #2

| | |
|---|---|
| Number of bits of result known up to now: | 4 |
| Bit Mask for bits known up to now: | 11110000 |
| Bits of result: | 01110000 |

Up to now known bits of result generated by:
bits k−1 to j+1 (bits 7 to 5)=matching bits of bit-wise AND and bit-wise OR in iteration #1—in this example 011.
setting bit j (bit 4) to <u>1</u> because of search for minimum.
remaining bits j−1 to 0 (bits 3 to 0) remain at 0.

| For AND: ($P_1$ to $P_{18}$) | | For OR: ($P_1$ to $P_{18}$) | |
|---|---|---|---|
| 01110010 | original | 01110010 | original |
| (01111111) | modified | (01110000) | modified |

-continued

| For AND: ($P_1$ to $P_{18}$) | | For OR: ($P_1$ to $P_{18}$) | |
|---|---|---|---|
| (01111111) | modified | (01110000) | modified |
| (01111111) | modified | (01110000) | modified |
| (01111111) | modified | (01110000) | modified |
| 01110010 | original | 01110010 | original |
| (01111111) | modified | (01110000) | modified |
| (01111111) | modified | (01110000) | modified |
| 01110010 | original | 01110010 | original |
| 01110010 | original | 01110010 | original |
| (01111111) | modified | (01110000) | modified |
| (01111111) | modified | (01110000) | modified |
| (01111111) | modified | (01110000) | modified |
| (01111111) | modified | (01110000) | modified |
| 01110010 | original | 01110010 | original |
| (01111111) | modified | (01110000) | modified |
| (01111111) | modified | (01110000) | modified |
| 01110010 | original | 01110010 | original |
| 01110010(bit-wise AND) | | 01110010(bit-wise OR) | |

Highest bit position where bit-wise AND and bit-wise OR differ (counting least significant bit as 0): −1 (j=−1)

| | |
|---|---|
| Number of bits of result known up to now: | 8 |
| Bit Mask for bits known up to now: | 11111111 |
| Bits of result: | 01110010 |

Up to now known bits of result generated by:
bits k−1 to j+1 (bits 7 to 0)=matching bits of bit-wise AND and bit-wise OR in iteration #4—in this example 01110010.
bit j (bit −1) does not exist.
there are no remaining bits j−1 to 0.
=> all bits of the result are known, i.e. the result is 01110010=114. Thus, processors $P_6$, $P_9$, $P_{10}$, $P_{15}$, $P_{18}$ hold the minimum value.

In accordance with the embodiments described above, the number of iterations needed for this way of determining the minimum is only the number of bits, in which the binary representation of any two of the original values, differ. Each iteration necessitates one common read with "AND", one common read with "OR", and one broadcast.

The number of bits used to represent numbers is typically 32, or may even be 64, and the number of bits in which a set of values differ, may be even less. If the number n of processors is significantly larger than the number of bits in which the set of values differ, for example, larger by several thousand, the "fast minimum finding" is significantly faster than the trivial way indicated above, which needs n read operations.

Embodiments of the invention were described using a plurality of processors $P_1$ to $P_n$ each providing a binary value. Other embodiments may use only a single processor or a reduced number of processors each holding in respective registers of memory elements associated therewith the binary values the maximum/minimum of which need to be determined by the central processor.

The above-described method can be implemented in hardware or in software. In addition, the implementation can be in a digital storage medium, for example a disc or a CD comprising electronically readable control signals, which can act together with a programmable computer system, for executing the method according to embodiments of the present invention. Generally, the invention is also a computer program product having a program code for executing the method according to embodiments of the present invention being stored on a machine readable carrier and executed when the computer program product runs of a computer. In other words, the invention is also a computer program having program codes for carrying out the method when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A method for determining a minimum/maximum of a plurality of binary values held by a plurality of processor memories or memories associated with respective processors, the method comprising:
   determining a bit position in the plurality of binary values subsequent to which all bit values are the same, wherein the determining including,
      commonly reading all binary values from all memories and generating a bit-wise OR combination of the commonly read plurality of binary values and a bit-wise AND combination of the commonly read plurality of binary values and based on the bit-wise OR combination and the bit-wise AND combination of the commonly read plurality of binary values, determining the bit location in the plurality of binary values subsequent to which all bit values are the same;
   selecting from the plurality of binary values, those binary values, the bit value of which at the bit position determined in the determining and all subsequent bit positions, if any, comprises a predetermined value;
   repeating the determining and selecting, wherein the determining is repeated on the basis of the binary values selected in the selecting until only one selected binary value, or a plurality of matching binary values, remain; and
   providing the remaining binary value as the minimum/maximum.

2. The method of claim 1, wherein the predefined value is "1" in case a maximum is to be determined, and wherein the predetermined value is "0" in case a minimum is to be determined.

3. The method of claim 1, wherein for generating a subsequent bitwise OR combination and a subsequent bit-wise AND combination the selecting comprises:
   in case the bit value of an original binary value at the bit position determined in the determining corresponds to the predetermined value, selecting the original binary values, and
   otherwise selecting a modified value; and
   wherein repeating the determining is based on the subsequent bit-wise OR combination and the subsequent bit-wise AND combination.

4. The method of claim 3, wherein
   for the subsequent bit-wise OR combination the modified value is formed by the up to now known bits of the minimum/maximum and the remaining bits of the existing bit-wise AND combination, and
   for the subsequent bit-wise AND combination, the modified value is formed by the up to now known bits of the minimum/maximum and the remaining, bits of the existing bit-wise OR combination.

5. The method of claim 4, wherein
the determining comprises:
- communicating the bit-wise OR combination and the bit-wise AND combination to the memories; and the selecting comprises:
- communicating the up to now known bit values of the minimum/maximum to the memories,
- for the subsequent bit-wise OR combination, instructing each memory to return the original value, in case the bit value at the bit position determined in the determining and all subsequent bit positions, if any, correspond to the up to now known bit values of the minimum/maximum, and
- otherwise, return the up to now known bit values of the minimum/maximum and the bit values of the retraining bit positions of the existing bit-wise AND combinations, and
- for the subsequent bit-wise AND combination, instructing each memory to return the original value, in case the bit value at the bit position determined in the determining, and all subsequent bit positions, if any, correspond to the up to now known bit values of the minimum/maximum, and
- otherwise, return the up to now known bit values of the minimum/maximum and the bit values of the remaining bit positions of the existing bit-wise OR combination.

6. A non-transitory computer storage medium comprising a computer readable program code for carrying out, when executing the program code by a processor, a method for determining a minimum/maximum of a plurality of binary values held by a plurality of processor memories or memories associated with respective processors, the method comprising:
- determining a bit position in the plurality of binary values, subsequent to which all bit values are the same, wherein the determining initially including,
  - commonly reading all binary values from all memories and generating a bit-wise OR combination of the commonly read plurality of binary values and a bit-wise AND combination of the commonly read plurality of binary values, and based on a comparison between the bit-wise OR combination and the bit-wise AND combination of the commonly read plurality of binary values, determining the bit location in the plurality of binary values subsequent to which all bit values are the same;
- selecting from the plurality of binary values, those binary values, the bit value of which at the bit location determined based upon the comparison between the bit-wise OR combination and the bit-wise AND combination, and all subsequent bit positions if any, comprises a predetermined value;
- repeating the determining and selecting, wherein the determining is repeated on the basis of the binary values selected in the selecting until only one selected binary value, or a plurality of matching binary values, remain; and
- providing the remaining binary value as the minimum/maximum.

7. A non-transitory computer readable medium, comprising a computer readable program code for carrying out, when executing the program code by a processor, a method for determining a minimum/maximum of a plurality of binary values held by a plurality of processor memories or memories associated with respective processors, the method comprising:
- commonly reading all binary values from all memories;
- generating a bit-wise OR combination of the commonly read plurality of binary values and a bit-wise AND combination of the commonly read plurality of binary values;
- determining the bit location in the plurality of binary values subsequent to which all bit values are the same, based on a comparison between the bit-wise OR combination and the bit-wise AND combination of the commonly read plurality of binary values;
- selecting from the plurality of binary values, those binary values, the bit value of which at the determined bit location, and all subsequent bit positions if any, comprises a predetermined value;
- repeating the determining and selecting, wherein the determining is repeated on the basis of the binary values selected in the selecting until only one selected binary value, or a plurality of matching binary values, remain; and
- providing the remaining binary value as the minimum/maximum.

8. A non-transitory computer readable medium, comprising a program code for carrying out, when executing the program code by a processor, a method for determining a minimum/maximum of a plurality of binary values held by as plurality of processor memories or memories associated with respective processors, the method comprising:
- determining a bit position in the plurality of binary values subsequent to which all bit values are the same, wherein the determining initially comprises:
  - commonly reading all binary values from all memories and generating a bit-wise OR combination of the commonly read plurality of binary values and a bit-wise AND combination of the commonly read plurality of binary values, and determining the bit location in the plurality of binary values subsequent to which all bit values are the same based on a comparison between the bit-wise OR combination and the bit-wise AND combination of the commonly read plurality of binary values;
- selecting from the plurality of binary values, those binary values, the bit value of which at the bit location determined in the determining and all subsequent bit positions, if any, comprises a predetermined value;
- repeating the determining and selecting, wherein the determining is repeated on the basis of the binary values selected in the selecting until only one selected binary value, or a plurality of matching binary values, remain; and
- providing the remaining binary value as the minimum/maximum.

9. A system comprising:
- a central processor;
- a logic coupled to the central processor and configured to output a bit-wise OR combination and a bit-wise AND combination of a plurality of input values to the central processor; and
- a plurality of memories associated with respective processors, each of the memories being coupled to the logic and configured to hold one of the plurality of binary values, wherein the central processor is configured to operate in accordance with a method for determining a minimum/maximum of a plurality of binary values held by a plurality of processor memories or memories associated with respective processors, the method including determining a bit position in the plurality of binary values subsequent to which all bit values are the same, wherein the determining initially including, commonly reading all binary values from all memories and generating bit-wise OR combination of the commonly read plurality of binary values and a bit-wise AND combination of the commonly read plurality of him values, and determining the bit location in the plurality of binary values subsequent to which all bit values are the same based on a comparison between the bit-wise OR combination and the bit-wise AND combination of the commonly read plurality of binary values;

selecting from the plurality of binary values, those binary values, the bit value of which at the bit location determined in the determining and all subsequent bit positions, if any, comprises a predetermined value;

repeating the determining and selecting, wherein the determining is repeated on the basis of the binary values selected in the selecting until only one selected binary value, or a plurality of matching binary values, remain; and providing the remaining binary value as the minimum/maximum.

10. The system of claim 9, wherein the logic, is implemented by the central processor.

11. The system of claim 9 being a tester for testing electronic devices, wherein the binary values represent test results.

12. An apparatus comprising:

a plurality of processor memories or memories associated with respective processors; and a processor configured to operate in accordance with a method for determining a minimum/maximum of a plurality of binary values held by the plurality of processor memories or memories associated with respective processors, the method including, commonly reading all binary values from all memories;

generating a bit-wise OR combination of the commonly read plurality of binary values and a bit-wise AND combination of the commonly read plurality of binary values;

determining the bit location in the plurality of binary values subsequent to which all bit values are the same based on a comparison between the bit-wise OR combination and the bit-wise AND combination of the commonly read plurality of binary values;

selecting from the plurality of binary values, those binary values, the bit value of which at the determined bit location, and all subsequent bit positions if any, comprises a predetermined value;

repeating, the determining, and selecting, wherein the determining is repeated on the basis of the binary values selected in the selecting, until only one selected binary value, or a plurality of matching binary values, remain; and providing the remaining binary value as the minimum/maximum.

* * * * *